E. COLE.
Whiffltree Coupling.
No. 92,706.            Patented July 20, 1869.
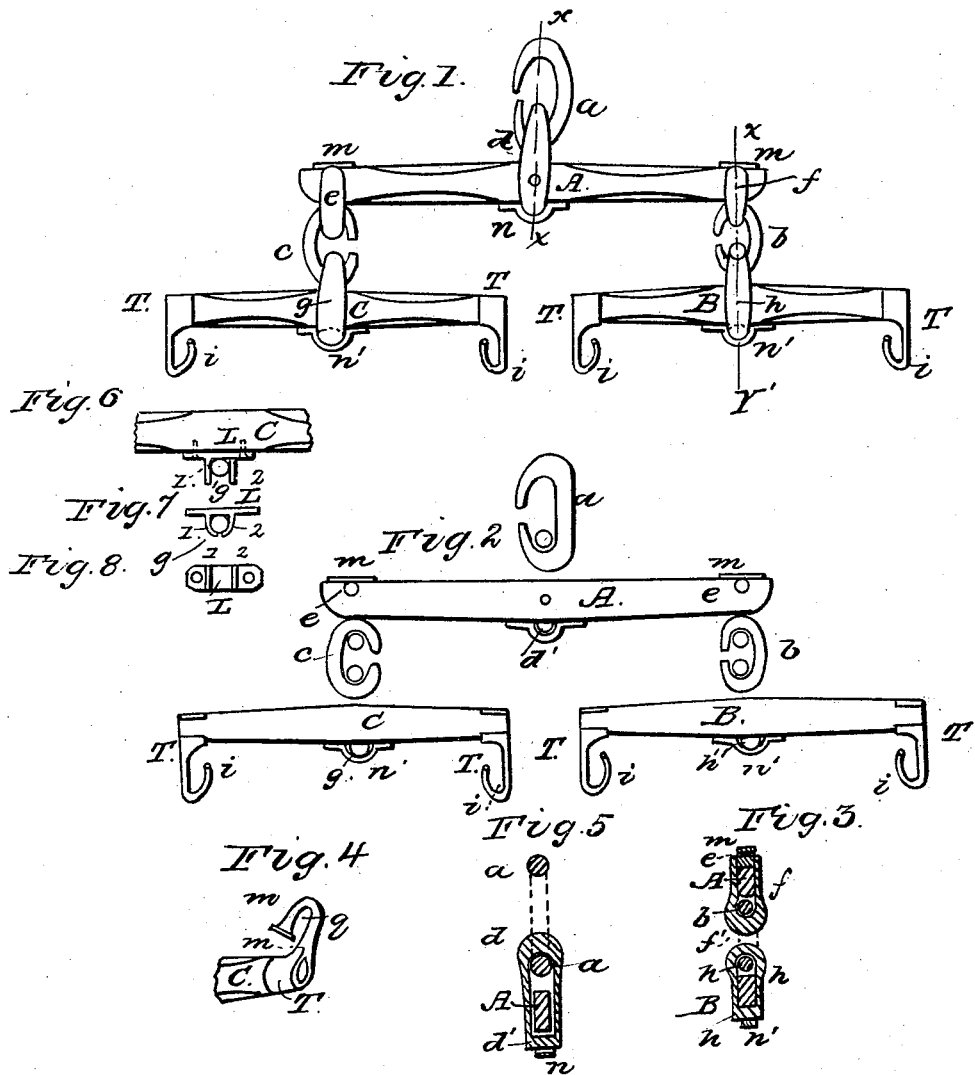
Witnesses
Inventor
Ezra Cole

EZRA COLE, OF FAIRFIELD, MICHIGAN.

Letters Patent No. 92,706, dated July 20, 1869.

ATTACHMENT FOR THE ENDS OF SINGLE-TREES.

The Schedule referred to in these Letters Patent and making part of the same.

*To all whom it may concern:*

Be it known that I, EZRA COLE, of the township of Fairfield, in the county of Lenawee, and State of Michigan, have invented a new and useful Improvement in "Whiffletree-Couplings;" and I do hereby declare that the following is a full, clear, and exact description of the construction and operation of the same, which will enable others skilled in the art to make and use my invention, reference being had to the annexed drawing, and to the letters of reference marked thereon, making a part of this specification, like letters referring to similar parts.

My invention relates to improvements in the hooks or cock-eyes placed at the extremities of the whiffletree, to which the traces are attached; and consists in attaching the shank of the cock-eye to the outer extremity of the thimble on the whiffletree, so that all danger of barking young trees, in plowing, by the end of the iron, to which the trace is attached, striking said trees, is obviated.

The hook or cock-eye has also a curved form in front, and two projections, to prevent the chain or other trace from becoming detached from the cock-eye.

Figure 4 represents a perspective view of one of the hooks or cock-eyes, T, as attached to the end of the single whiffletree O or B.

The cock-eye T is constructed in a peculiar manner, having for its novelty the shank of the hook attached to the outer extremity of the thimble, so as to avoid the possibility of the end of the whiffletree catching against trees or other obstructions.

Also, having the hook turning very short out of a straight shank, as shown at *i*, for the purpose of strengthening the hook, and bringing it in a direct line behind the traces or tugs, the draught being thereby thrown nearly lengthwise of the shank.

The point of the hook of the cock-eye is T-ended, to prevent the eye of the traces becoming unhooked while backing the team or going down-hill.

Having thus fully described my invention,

What I claim as new, and desire to secure by Letters Patent, is—

The cock-eye or hook, when constructed in the manner and for the purposes set forth.

EZRA COLE.

Witnesses:
L. R. WALLACE,
NELLIE PARKER.